Sept. 23, 1924.
C. E. MAYNARD
1,509,363
RUBBER STOCK AND METHOD OF PREPARING THE SAME
Filed March 29, 1923
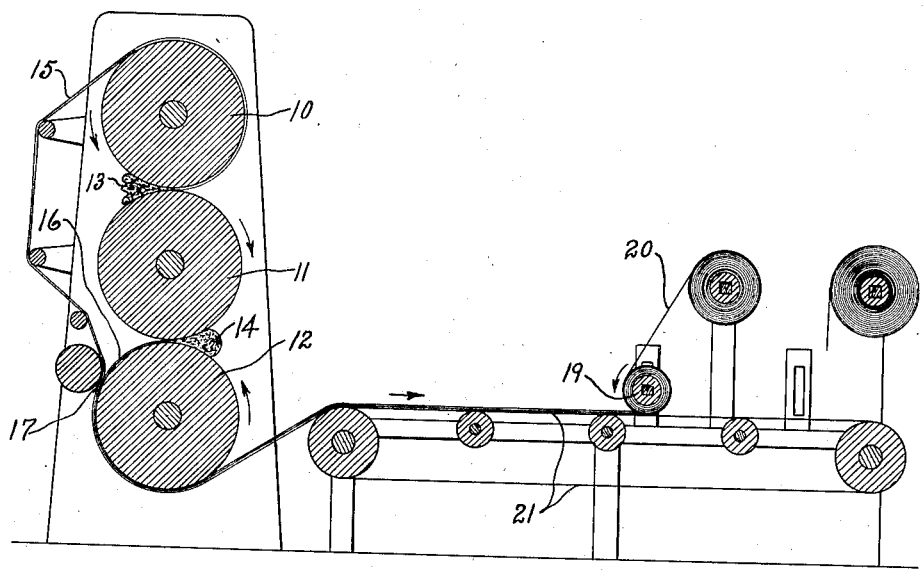
Fig.1.
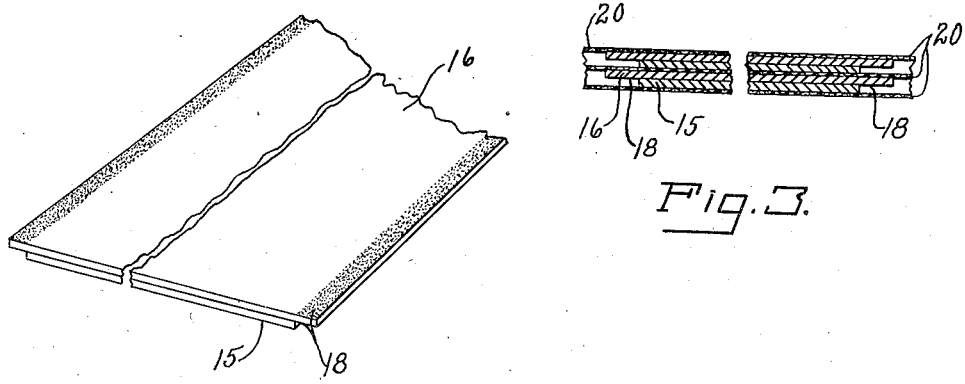
Fig.2.
Fig.3.
INVENTOR.
Charles Edgar Maynard
BY
Edward C. Taylor
ATTORNEY.

Patented Sept. 23, 1924.

1,509,363

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

RUBBER STOCK AND METHOD OF PREPARING THE SAME.

Application filed March 29, 1923. Serial No. 628,483.

*To all whom it may concern:*

Be it known that I, CHARLES EDGAR MAYNARD, a citizen of the United States of America, residing at Northampton, in the county of Hampshire and State of Massachusetts, have invented certain new and useful Improvements in Rubber Stock and Methods of Preparing the Same, of which the following is a specification.

This invention relates to sheet rubber stock, and to a method of preparing the same, with particular reference to stock having certain characteristics which will appear more fully below.

In the manufacture of rubber goods, such, for example, as the inner tubes used in automobile tire casings, it is desirable in certain instances to use the stock in a dry or substantially non-adhesive condition, so that if two surfaces happen to come in contact they will not stick together unless their adhesion is desired. It is known that such stock is secured by proper control of the rubber calenders (in a manner familiar to any practical calender man) so that the surface of the rubber sheet has a tendency to become dry, possibly due to "bloom," or a development of a surface dust of sulfur crystals which migrate from the body of the rubber. The stock so prepared is customarily stored until the time for use between layers of a separating material such as cotton sheeting, being so placed as soon as it is calendered.

In certain uses of this stock it is desirable to have the edges of the sheet of a tacky or adhesive consistency instead of the dry and non-adhesive consistency of the body of the sheet. This is particularly useful, for example, in the making of inner tubes, in which one edge of the sheet must be stuck to the mandrel and the other to the outer surface of the tube. Prior to this invention there has been no way of securing this condition except to brush the edge of the stock with a rubber solvent such as naphtha. Dry stock of the consistency desired in the body of the sheet takes a large quantity of naphtha to make it adhesive, and the use of such a large quantity is objectionable owing to the deleterious action of the naphtha in volatilizing and expanding when heated during the vulcanization of the rubber. By this invention the use of an excessive amount of solvent is avoided, and the stock supplied in condition for ready and reliable use.

The invention will be described in conjunction with a preferred form of sheet having a body portion of two-ply thickness and single ply edges, but in certain aspects it is not restricted to such use. Such a laminated stock is useful in certain methods of tube building by reason of the decreased thickness of its edge portions, and its utility is enhanced by making its edges more adhesive than the body of the sheet.

Briefly stated, the result attained depends upon the fact that the drying or blooming of the rubber stock is not entirely dependent upon the calendering conditions, as has been previously thought, but is started, or at least hastened, by the pressure of the fabric "liner" or separating strip. This is an action which is possibly of the nature of a catalysis, similar to the action of a speck of dust or a small crystal in starting crystallization in a solution, a process sometimes called inoculation or seeding. Whatever the true nature of this action may be, it appears that the blooming or drying of a sheet of calendered rubber is assisted by pressure contact with fabric.

In the practical application of this theory to my invention a rubber stock which will dry fairly quickly in a liner is used, so that by the time the stock is received for use in the building operation its surface will be as non-adhesive as desired. This stock is then wound into a roll between turns of a fabric liner, but the edges of the stock are kept from pressure contact with the liner. The most convenient way of doing this is found in the use of the laminated stock referred to, where the edges are thinner than the body of the sheet. When stock of this character is wound up with a liner the pressure is taken up by the thicker central portion of the sheet, leaving the thinner edge portions under no substantial pressure. While they may contact loosely with the liner they do not do so with sufficient pressure to cause the catalytic or drying action. Consequently when the sheet is removed from the liner for use the center will be found to be dry and non-adhesive, while the thin edges, protected from the degree of pressure contact borne by the body of the stock, will be adhesive and tacky.

Instead of relieving, by the thickening of the stock, the pressure on the portions to be left tacky, this may be accomplished in other ways, such for example as rolling the stock with a lining material having cut away portions and designed to bear only upon the sections of the rubber to be made dry.

The invention has been illustrated in the accompanying drawings, in which

Fig. 1 is a diagrammatic view of a calender for producing two-ply rubber stock;

Fig. 2 is a detail showing a sheet of the two-ply stock; and

Fig. 3 is a detail section illustrative of the manner in which the stock is assembled with a liner.

The manner of producing the stock illustrated in Fig. 1 is in general that of the Hanna Patent No. 1,289,744, dated December 31, 1918. The calender has three rolls 10, 11, and 12, driven as indicated by the arrows. Two feeds of rubber 13 and 14 are sheeted out by the rolls into sheets 15 and 16 which are united at 17 to form a composite sheet. This sheet is indicated in Fig. 2, in which it appears that the sheet 16 is wider than the sheet 15, so as to present a marginal portion 18 of reduced thickness. The specific manner in which the sheet is produced to this point forms no part of my invention.

The composite sheet so formed is wound on a spool 19 between turns of a liner 20, the sheet being conveniently led to the point of winding by a belt conveyor 21 which serves also to rotate the spool 19. A fragmentary section of the material wound on the spool is shown in Fig. 3, the section being taken on a plane passing through the axis of the spool. It will be there seen that the body of the sheet will be held tightly between adjacent turns of the liner, while the marginal portions, although they may contact with the liner, are not subjected to any pressure. This absence of pressure contact with the fabric causes the marginal portions to remain substantially tacky in the manner discused above.

Having thus described my invention, I claim:

1. A two-ply rubber sheet of which one ply extends beyond the other so as to present a thin edge, the body of the sheet being substantially dry, and both surfaces of the edge portions being substantially unbloomed and tacky.

2. A rubber sheet having a dry body portion and a substantially unbloomed and tacky marginal portion.

3. A method of producing sheet rubber stock having predetermined adhesive and non-adhesive portions, which comprises sheeting out rubber of a consistency and quality adapted to dry out when placed in pressure contact with fabric, associating the sheet with fabric for pressure contact therewith, and relieving from such pressure contact the portions of the sheet to be left adhesive.

4. A method of producing sheet rubber stock which comprises laminating two plies of stock in such a manner that the edge portion of one extends beyond the edge of the other to give a thin marginal portion, the stock being of a consistency and quality adapted to dry out when wound in contact with fabric, and winding the two-ply stock with an intermediate lining of fabric, whereby the body of the sheet is caused to become dry and the marginal portions to remain tacky on account of the absence of pressure contact with the fabric.

CHARLES EDGAR MAYNARD.